United States Patent Office 3,420,751
Patented Jan. 7, 1969

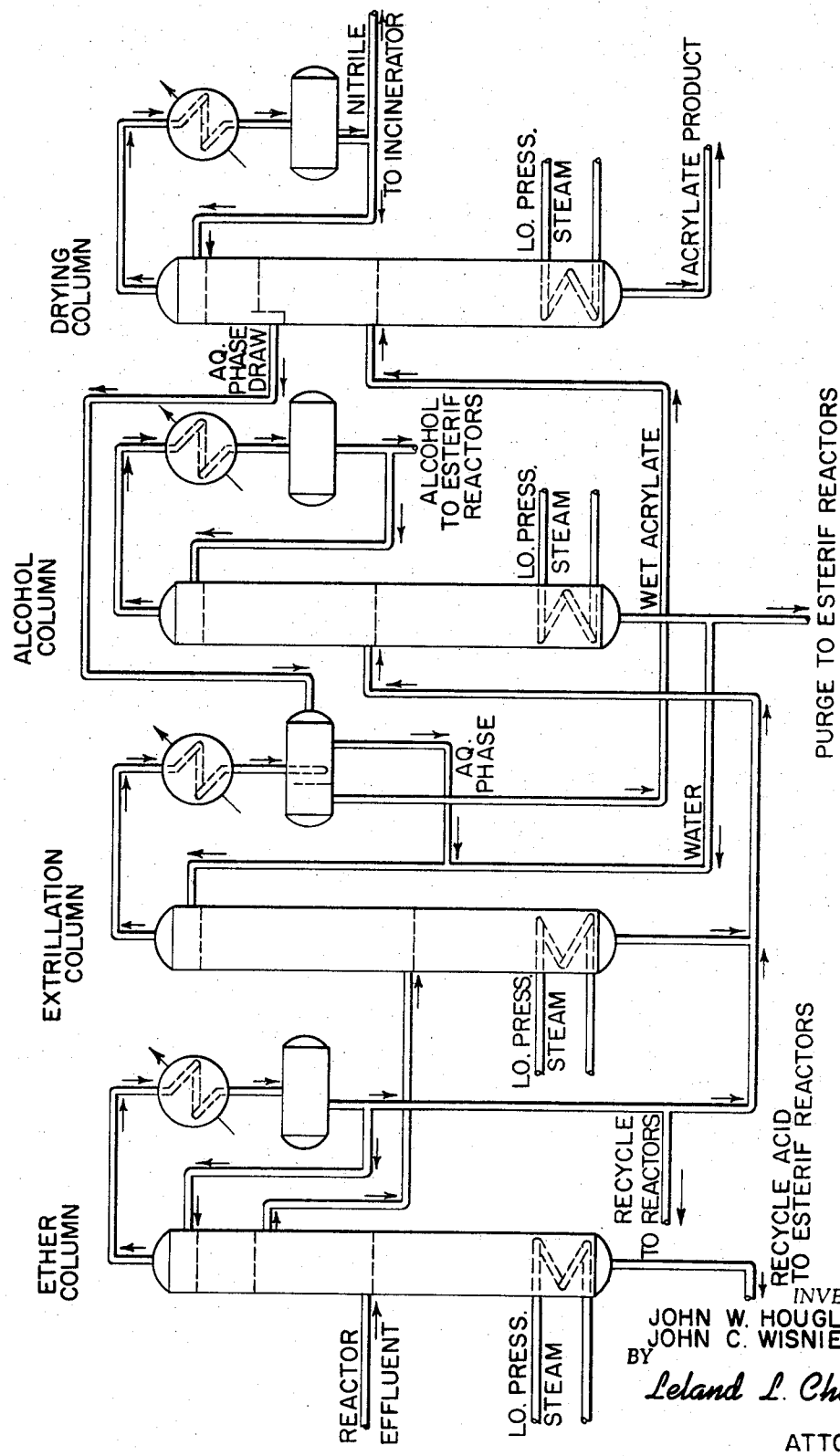

3,420,751
PROCESS FOR RECOVERY AND PURIFICATION OF ACRYLATE AND METHACRYLATE ESTERS BY EXTRACTIVE DISTILLATION WITH WATER
John W. Hougland, Northfield, and John C. Wisniewski, Parma, Ohio, assignors to The Standard Oil Company, Cleveland, Ohio, a corporation of Ohio
Filed Mar. 20, 1967, Ser. No. 624,308
U.S. Cl. 203—82  4 Claims
Int. Cl. B01d 3/40; B01d 3/36

ABSTRACT OF THE DISCLOSURE

The present invention relates to an improved process for the separation of mixtures comprising alcohols, uneaturated nitriles, unsaturated acids, water and unsaturated carboxylic acid esters which are capable of forming azeotropic mixtures and more particularly to an improved process for separating such mixtures by using a simple and effective extractive distillation step for selectively fractionating a complex mixture of products from an esterification reactor. The instant invention makes possible the use of a single train of the same four distillation columns for the separation and purification of any one of the acrylate monomers referred to herein.

CROSS REFERENCES TO RELATED APPLICATIONS

Ser. No. 394,966 filed Sept. 8, 1964 and now U.S. Patent No. 3,325,534.

BACKGROUND OF THE INVENTION

The separation of mixtures containing esters and alcohols often provides great difficulties as many ester-alcohol pairs form azeotropic mixtures with each other or the boiling points of both components are so close that a distillative separation is not possible. The task becomes much more difficult and complex when in addition to the alcohol and esters the mixture comprises unreacted components fed to an esterification reactor wherein an unsaturated nitrile is reacted with an alcohol to form the desired carboxylic acid ester. In a commercial operation where it is important that the same reactor, usually a multi-staged reactor, and basically the same auxiliary equipment be utilized to manufacture a variety of unsaturated acid esters, the complexity of the task of selecting a process which is equally suitable for the recovery of any one or more of the desired products is compounded.

It is particularly difficult to separate the desired product from unreacted reactants and intermediate products for recycle in a process for making alkyl $\alpha$-$\beta$ olefinically unsaturated esters by hydrolyzing at least one $\alpha$-$\beta$ olefinically unsaturated nitrile having the formula

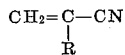

wherein R is a member selected from the group consisting of hydrogen, a lower alkyl group having from 1 to 4 carbon atoms, and a halogen, with a mineral oxyacid in a hydrolyzing zone, and esterifying the intermediate product in a multi-stage esterification reactor such as described in copending application Ser. No. 394,966.

Various proposals for processes have been made for the separation of alcohols and esters. One old process consists of removing the alcohol from the ester by washing it out, for example, with water. However, in such a procedure, a portion of the ester is lost by dissolution in the extracting medium and the alcohol is obtained in great dilution. Other proposals depend upon the extractive distillation of the ester alcohols mixtures upon addition of a foreign liquid such as dicarboxylic acid esters, hydrocarbons, ketones, ketoesters, or alkoxycarboxylic acid esters. The disadvantage of such processes has been that an extraneous liquid is required which usually leads to further intermediate fractionations and the complications of separation are multiplied several fold.

In a case such as in the example described hereinbelow, where tht desired product is ethyl acrylate and where the effluent from an esterification reactor comprises a mixture of ethyl alcohol, ethyl acrylate, acrylonitrile, diethyl ether, $\beta$-ethoxy ethylpropionate, acrylic acid, water and some inhibitor, and at least seven azeotropic mixtures, the normal approach would be to distill off the azeotropic ester-alcohol mixture from the higher boiling starting material in a first distillation, then separate the distilled ester-alcohol mixture into alcohol and an ester-foreign liquid mixture by extractive distillation and separate the latter by a third distillation. Such a process, however, is rather uneconomical for the reason that it entails several additional distillation columns and related expensive equipment, at the same time requiring that some of the distillation columns from the one operation be substituted with yet other columns when the product desired is another ester, for example, methylacrylate or methylmethacrylate, because columns designed for the one operation are inoperable under another.

The Encyclopedia of Chemical Technology, by Kirk and Othmer, Second Edition, in vol. I at p. 297 describes a process for the preparation of ethyl or methyl acrylates by using nickel carbonyl, carbon monoxide, acetylene, hydrogen chloride, and methyl or ethyl alcohol. The liquid stream from the reactor is stored under refrigeration to prevent polymerization and is then fed continuously to a packed liquid-liquid extraction column where the solvent is water. The crude acrylate comes out the top. Material extracted by the water goes out the bottom of the column and into a series of distillation columns to separate alcohol and brine and to concentrate the alcohol. It is seen from the flow sheet for the manufacture of acrylate monomers on p. 298 of the same reference, that it takes some seven (7) towers and a variety of tanks to effect recovery and purification of the acrylate monomers. This complicated and elaborate distillation system is apparently necessary in spite of the fact that the number of components in the reactor effluent from the catalytic carbonyl reaction is substantially smaller than those obtained by the esterification reaction referred to hereinabove.

SUMMARY OF THE INVENTION

According to the instant invention it was unexpectedly found that mixtures containing esters of unsaturated carboxylic acids and alcohols, among other intermediate products, could be separated in an unexpectedly simple manner by extractive distillation with water. Ester from the ester-water azeotrope going overhead may be conveniently dried, after decantation of the immiscible water phase, in a single distillation column. The advantage of the instant process is that the same equipment used for the production of one acrylate monomer may be used for other acrylate monomers. At the same time equipment for recovering the recycling of unreacted components and intermediate products is the same for any desired acrylate and the process can be practiced with a total of only four (4) distillation columns, one of which is the extractive distillation column, also called in "extrillation" column.

BRIEF DESCRIPTION OF THE DRAWING

The instant process is carried out in a train of four (4) distillation columns, one of which is an extrillation column. The first distillation column is called an ether column. The second distillation column is the extrillation column equipped with a decanter for separating an organic liquid phase from an aqueous liquid phase. The third distillation column is called an alcohol column. The fourth distillation column is called a drying column. The drying column is equipped with an internal decanter for drawing off an aqueous phase just above the feed tray. All the columns are equipped with conventional auxiliary equipment and instrumentation.

BRIEF DESCRIPTION OF THE PREFERRED EMBODIMENT

The following description of the instant process is given with specific relation to the production of ethyl acrylate from a mixture of ethyl alcohol and acrylonitrile. Feed from a multi-staged reactor comprises a mixture of ethyl acrylate, diethyl ether, ethyl alcohol, acrylonitrile, water, acrylic acid and β-ethoxy ethylpropionate. The feed is introduced into the lower section of the ether column at about the 10th tray. Overhead from the ether column is mostly diethyl ether which is condensed and a portion refluxed to the top of the ether column; the remaining portion may be led to an alcohol column to be described hereinafter, or recycled to the multi-staged reactors. A preferred operation is to divide said remaining portion between the alcohol column and the reactors. Bottoms from the ether column is mostly acrylic acid, ethyl alcohol, water and β-ethoxy ethylpropionate which is recycled to the reactors.

A side-draw of liquid comprising ethyl alcohol, ethyl acrylate, water and acrylonitrile is withdrawn from about the 20th tray of the ether column and is led to the lower portion of the extrillation column. Overhead from the extrillation column, which is an ethyl acrylate-water azeotrope containing a minor quantity of acrylonitrile, is condensed and run into a decanter where a phase separation takes place. The water phase with ethyl acrylate in it is refluxed to the top of the extrillation column while the organic phase which is substantially wet ethyl acrylate is led to the drying column to be described hereinafter.

Feed to the alcohol column comprises ethyl alcohol, water and diethyl ether, the ethyl alcohol and water coming from the bottom of the extrillation column and the diethyl ether being part of the overhead from the ether column; feed is introduced at about its middle on the 15th tray. The overhead from the alcohol column is condensed and most of it refluxed to the top of the alcohol column. Part of the reflux is drawn off to the multi-staged esterification reactor. The bottoms from the alcohol column is substantially water most of which is conducted to the top of the extrillation column; the remaining part of the water is purged to one of the stages of the multi-staged esterification reactor.

The wet acrylate from the extrillation column comprising ethyl acrylate product and a minor amount of acrylonitrile saturated with water is led onto the 25th tray of the drying column about at its midpoint. Overhead from the drying column is substantially acrylonitrile and diethyl ether which is condensed and most of it refluxed to the top of the column. Part of the acrylonitrile in the overhead is drawn off as vapor from the reflux stream and incinerated. The drying column is equipped with an internal decanter above the feed tray; downflowing liquid from the rectification section of the column is held in the internal decanter long enough to undergo a liquid-liquid phase separation. The aqueous phase is drawn off and led to the decanter of the extrillation column. The organic phase spills into the stripping section of the column. The feature of an internal decanter in this drying column enables this column to make a three-way separation which eliminates the need for an additional column. From an operational point of view, the internal decanter allows the column to operate without upsetting the temperature profile in the column. Substantially dry acrylate product is removed as a vapor stream from the bottoms of the drying column; product purity usually exceeds 99 percent.

It is generally unnecessary to purify the acrylate product further but this may be done, if desired, by any conventional means such as by passing the acrylate over a bed of desiccant, preferably the molecular sieve type, or by an additional distillation under vacuum.

EXAMPLE

In the following example, streams entering and leaving each distillation column are specified as to major components and their composition. All numbers refer to parts by weight.

ETHER COLUMN

| | Feed | Overhead | Bottoms | Side Draw |
|---|---|---|---|---|
| Diethyl ether | 97.1 | 92.4 | | 4.7 |
| Ethyl alcohol | 1,789 | | 482 | 1,307 |
| Acrylonitrile | 7.6 | | | 7.6 |
| Ethyl acrylate | 820 | 1 | | 819 |
| Water | 518 | | 336 | 182 |
| Acrylic acid | 18.7 | | 18.7 | |
| BEEP [1] | 150 | | 150 | |

[1] BEEP—Initials for beta ethoxy ethyl propionate.

EXTRILLATION COLUMN

| | Feed [1] | Overhead | Bottoms |
|---|---|---|---|
| Diethyl ether | 4.7 | 4.7 | |
| Ethyl alcohol | 1,307 | | 1,307 |
| Acrylonitrile | 7.6 | | |
| Ethyl acrylate | 819 | | |
| Water | 182 | 230 | 4,836 |

[1] Feed does not include water from alcohol column.

ALCOHOL COLUMN

| | Feed [1] | Feed [2] | Overhead | Bottoms |
|---|---|---|---|---|
| Diethyl ether | | 4.7 | 4.7 | |
| Ethyl alcohol | 1,307 | 0.3 | 1,305.7 | 1.6 |
| Acrylonitrile | 7.6 | | 7.6 | |
| Ethyl acrylate | 0.5 | | 0.5 | |
| Water | 4,836 | 0.2 | 173.2 | 4,663 |

[1] Feed is bottoms from extrillation column.
[2] Feed is diethyl ether stream from ether column.

DRYING COLUMN

| | Feed | Overhead | Aqueous Draw-off | Bottoms |
|---|---|---|---|---|
| Diethyl ether | 4.7 | 4.7 | | |
| Ethyl alcohol | 0.3 | 0.3 | | |
| Acrylonitrile | 8.2 | 7.6 | 0.6 | |
| Ethyl acrylate | 820.7 | | 0.7 | 820 |
| Water | 29.7 | 0.4 | 29 | 0.3 |

We claim:

1. An extractive distillation process for the separation of mixtures which contain alkanols containing from 1 to 4 carbons atoms, unsaturated carboxylic acid esters, olefinically unsaturated nitriles and water, comprising in combination:
   (a) introducing said mixtures into an extractive distillation column;
   (b) introducing water into the upper portion of said column as the extractive agent;
   (c) withdrawing an unsaturated carboxylic acid ester-water azeotrope containing a minor quantity of the nitrile from the head of said column as a distillate;
   (d) separating the relatively insoluble organic phase of said azeotrope from the aqueous phase;
   (e) returning said aqueous phase to the upper portion of said column, and
   (f) withdrawing an alkanol-water mixture from the sump of said column.

2. The process of claim 1 in combination with a process utilizing a first ether column for distilling reactor effluent containing, in addition to the mixtures in claim 1, alkyl ether containing from 2 to 8 carbon atoms, alkoxy carboxylic acid ester containing from 2 to 8 carbon atoms and unsaturated carboxylic acid containing from 2 to 6 carbon atoms comprising:
(a) introducing said effluent from an esterification reactor on to the feed tray of said ether column;
(b) withdrawing from the head of said ether column an alkyl ether-rich overhead stream;
(c) refluxing a portion of said alkyl ether-rich stream to the upper portion of said ether column;
(d) recycling the remaining portion of said alkyl ether-rich stream to an alcohol column;
(e) recycling a mixture comprising alkanol, water, unsaturated carboxylic acid and alkoxy carboxylic acid ester from the sump of said ether column to said reactor, and
(f) withdrawing a side-stream from a location above said feed tray and conducting said side-stream which contains alkanols containing from 1 to 4 carbon atoms, unsaturated carboxylic acid esters, olefinically unsaturated nitriles and water, into said extractive distillation column.

3. In combination with the process of claim 2 utilizing an extractive distillation column and an ether column, the process comprising:
(a) introducing said relatively insoluble organic phase onto a feed tray located about the midportion of a drying column;
(b) withdrawing the aqueous phase from an internal decanter disposed above the feed tray and within said drying column;
(c) returning at least a portion of said aqueous phase from said internal decanter to the decanter of said extractive distillation column;
(d) withdrawing from the head of said drying column a nitrile-rich stream;
(e) refluxing a portion of said nitrile-rich stream to the upper portion of said drying column;
(f) disposing of the remainder of said nitrile-rich stream;
(g) withdrawing from the sump of said drying column high purity essentially water-free product.

4. In combination with the process of claim 2 utilizing an extractive distillation column and an ether column, the process comprising:
(a) introducing said alkanol-water mixture into the middle portion of said alcohol column;
(b) withdrawing from the head of said alcohol column an alkanol-rich stream;
(c) refluxing a portion of said alkanol-rich stream to the upper portion of said alcohol column;
(d) recycling the remaining portion of said alkanol-rich stream for reuse;
(e) withdrawing from the sump of said alcohol column an essentially aqueous stream;
(f) recycling a portion of said aqueous stream from the sump of said alcohol column to the upper portion of said extractive distillation column.

References Cited

UNITED STATES PATENTS

| | | | |
|---|---|---|---|
| 2,806,816 | 9/1957 | Staib et al. | 203—82 |
| 2,878,167 | 3/1959 | Alheritiere et al. | 203—97 |
| 2,916,512 | 12/1959 | Fisher | 260—486 |
| 2,980,730 | 4/1961 | Dobson | 260—486 |
| 3,157,693 | 11/1964 | Wheeler et al. | 260—486 |
| 3,261,767 | 7/1966 | Knorr et al. | 260—486 |
| 3,264,347 | 8/1966 | Sennewald et al. | 260—486 |
| 3,354,199 | 11/1967 | Lachowicz et al. | 203—60 |
| 3,325,534 | 6/1967 | Hardman et al. | 260—486 |

FOREIGN PATENTS 1,003,007   9/1965   Great Britain.

WILBUR L. BASCOMB, JR., *Primary Examiner.*

U.S. Cl. X.R.

203—83, 96, 97, 14, 18, 98, 99; 260—486, 643, 616